(12) United States Patent
Lee

(10) Patent No.: US 7,841,949 B2
(45) Date of Patent: Nov. 30, 2010

(54) MOUNTING STRUCTURE OF CONSTANT VELOCITY JOINT AND BEARING

(75) Inventor: Kyung Don Lee, Sinahndong (KR)

(73) Assignee: Korea Flange Co., Ltd., Ulsan (KR)

( * ) Notice: Subject to any disclaimer, the term of this patent is extended or adjusted under 35 U.S.C. 154(b) by 331 days.

(21) Appl. No.: 12/213,709

(22) Filed: Jun. 24, 2008

(65) Prior Publication Data

US 2009/0005182 A1 Jan. 1, 2009

(30) Foreign Application Priority Data

Jun. 27, 2007 (KR) ...................... 10-2007-0063372

(51) Int. Cl.
 *F16D 3/84* (2006.01)
(52) U.S. Cl. ...................... 464/178; 384/544
(58) Field of Classification Search .................. 464/178, 464/906
 See application file for complete search history.

(56) References Cited

U.S. PATENT DOCUMENTS

| | | | | | |
|---|---|---|---|---|---|
| 1,652,214 | A | * | 12/1927 | Putnam | ...................... 188/194 |
| 1,950,592 | A | * | 3/1934 | Bock | ........................... 384/589 |
| 2,052,524 | A | * | 8/1936 | Baker | .......................... 384/589 |
| 3,156,506 | A | * | 11/1964 | Scheifele et al. | ............. 384/589 |
| 3,515,448 | A | * | 6/1970 | Jensen et al. | ................. 384/589 |
| 3,981,513 | A | * | 9/1976 | Erskine | .................. 280/93.512 |
| 4,150,468 | A | * | 4/1979 | Harbottle | .................. 29/898.09 |
| 5,328,275 | A | * | 7/1994 | Winn et al. | .................. 384/472 |
| 5,386,630 | A | * | 2/1995 | Fox | .......................... 29/898.09 |
| 5,757,084 | A | * | 5/1998 | Wagner | .................... 301/105.1 |
| 5,875,550 | A | * | 3/1999 | Kohn | ....................... 29/898.07 |
| 6,149,244 | A | * | 11/2000 | Wagner | .................... 301/105.1 |
| 6,450,585 | B1 | * | 9/2002 | Kochsiek | .................. 301/124.1 |
| 6,485,188 | B1 | * | 11/2002 | Dougherty | ................... 384/589 |
| 6,533,363 | B1 | * | 3/2003 | Hayes et al. | .............. 301/105.1 |
| 6,857,786 | B2 | * | 2/2005 | Csik | ............................ 384/589 |
| 7,506,940 | B2 | * | 3/2009 | White | ....................... 301/105.1 |

* cited by examiner

*Primary Examiner*—Aaron Dunwoody
(74) *Attorney, Agent, or Firm*—MH2 Technology Law Group LLP

(57) ABSTRACT

In a CV joint-bearing mounting structure, a steering unit, including a CV joint and a bearing, is engaged with a knuckle via tapered portions, a first nut is mounted to the outer end of the bearing, a disk is engaged with an engagement part of the CV joint via toothed portions, and a second nut is mounted to one end of the CV joint. The quality of the bearing is improved, the tolerance of the assembled components is reduced, and the types and number of the components are reduced, thereby improving the efficiency of assembly of the components.

5 Claims, 6 Drawing Sheets

MOUNTING STRUCTURE OF CONSTANT VELOCITY JOINT AND BEARING

BACKGROUND OF THE INVENTION

1. Field of the Invention

The present invention relates to a mounting structure of a Constant Velocity (CV) joint and a bearing.

2. Description of the Related Art

Generally, in a bearing, an inner race member is defined by a tube portion of a hub, into which one end of a drive shaft is inserted to be engaged therewith, and an outer race member is arranged outside the inner race member, with balls interposed between the inner and outer race members.

Accordingly, it is required to fixedly insert the outer race member of the bearing into a hole of a knuckle in order to rotatably mount the inner race member, that is, a hub of the bearing.

FIG. 1 is an exploded perspective view illustrating a conventional CV joint-bearing mounting structure.

As shown in FIG. 1, a knuckle 100 and a bearing 110 are coupled with each other by interference fitting, the bearing 110 and a hub assembly 120 are coupled with each other by interference fitting, and a disk 130 and the hub assembly 120 are coupled with each other in a bolting structure, that is, using a plurality of bolts 140.

However, this mounting structure has drawbacks in that the process of repairing a defect in the bearing 110 and/or the hub assembly 120 is complicated, a large number of components is used, and the quality of the bearing 110 is degraded.

FIG. 2 is an exploded perspective view illustrating another conventional CV joint-bearing mounting structure.

The mounting structure shown in FIG. 2 is more advanced than the mounting structure shown in FIG. 1. In this mounting structure, a knuckle 200, a CV joint and a bearing unit 210 are coupled together by a plurality of bolts 220, and the disk 230 is coupled with the bearing unit 210 by bolts.

This mounting structure has merits compared to that shown in FIG. 1, such as excellent quality of the bearing and a smaller number of components. However, there is a problem in that the CV joint 210 extends through the knuckle 200, thereby increasing the weight of the knuckle 200.

Furthermore, a large number of components is still used, even though the number is decreased compared to that shown in FIG. 1. Thus, there are drawbacks, such as a long assembly time and a complicated assembly process, and thus productivity is poor.

SUMMARY OF THE INVENTION

The present invention has been made to solve the foregoing problems with the prior art, and therefore an object of the present invention is to provide a CV joint-bearing mounting structure, in which a steering unit, including a CV joint and a bearing, is engaged with a knuckle via tapered portions, a first nut is mounted to the outer end of the bearing, a disk is engaged with an engagement part of the CV joint via toothed portions, and a second nut is mounted to one end of the CV joint, so that the quality of the bearing is improved, the tolerance of assembled components is reduced, and the types and number of the components are reduced, thereby improving the efficiency of assembly of the components.

According to an aspect of the present invention for realizing the object, the CV joint-bearing mounting structure of the present invention includes a steering unit, which includes a CV joint and a bearing having a tapered structure; a knuckle having a tapered recess in the inner circumference thereof, the tapered recess engaging with the outer circumference of the bearing; a first nut screwed to the outer end of the bearing, thereby fixing the bearing; a disk having a toothed structure in the inner portion thereof, the toothed structure threadedly engaged with an engagement part of the CV joint; and a second nut screwed to one end of the CV joint, so that the disk is fixed to the CV joint.

According to an embodiment of the present invention, the outer end of the bearing may have a thread to engage with the first nut.

According to another embodiment of the present invention, the engagement part of the CV joint may have a threaded structure, which engages with the inner portion of the disk.

According to a further embodiment of the present invention, the one end of the CV joint may have a thread to thus engage with the second nut.

According to a yet another embodiment of the present invention, a center hole having a predetermined diameter may be formed in the first nut, the diameter of the center hole being larger than the diameter of the engagement part of the CV joint.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully with reference to the accompanying drawings, in which preferred embodiments of the present invention are shown.

Figure 1:
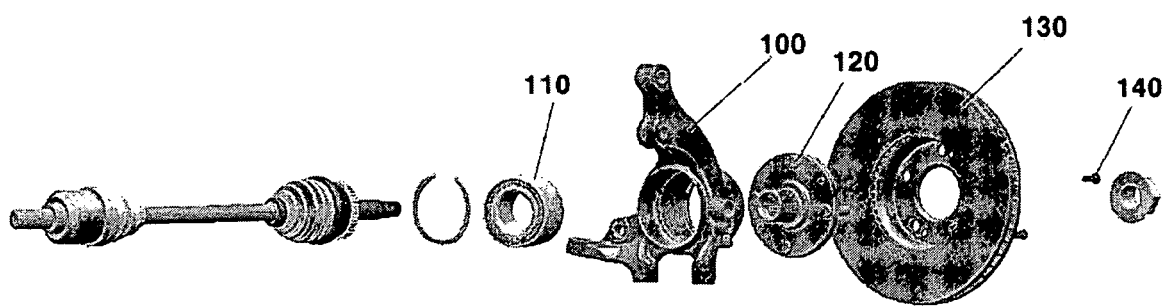
FIG. 1 is an exploded perspective view illustrating a conventional CV joint-bearing mounting structure.
Figure 2:
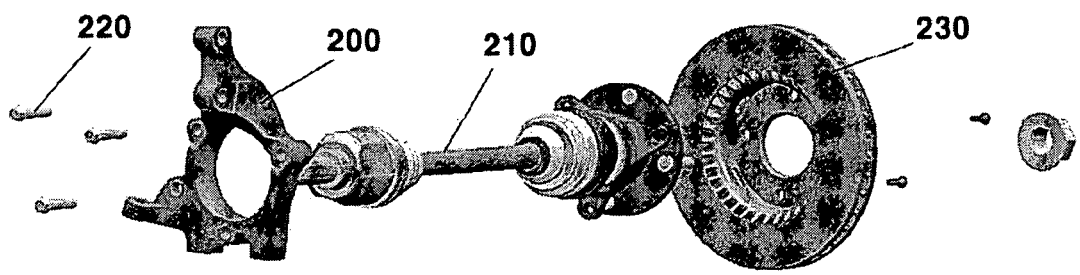
FIG. 2 is an exploded perspective view illustrating another conventional CV joint-bearing mounting structure.
Figure 3:
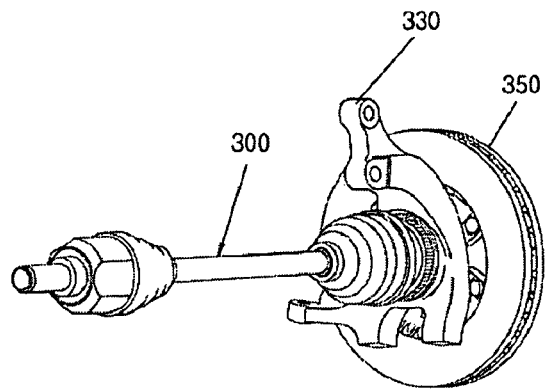
FIG. 3 is an assembled perspective view illustrating a CV joint-bearing mounting structure according to the present invention.
Figure 4:
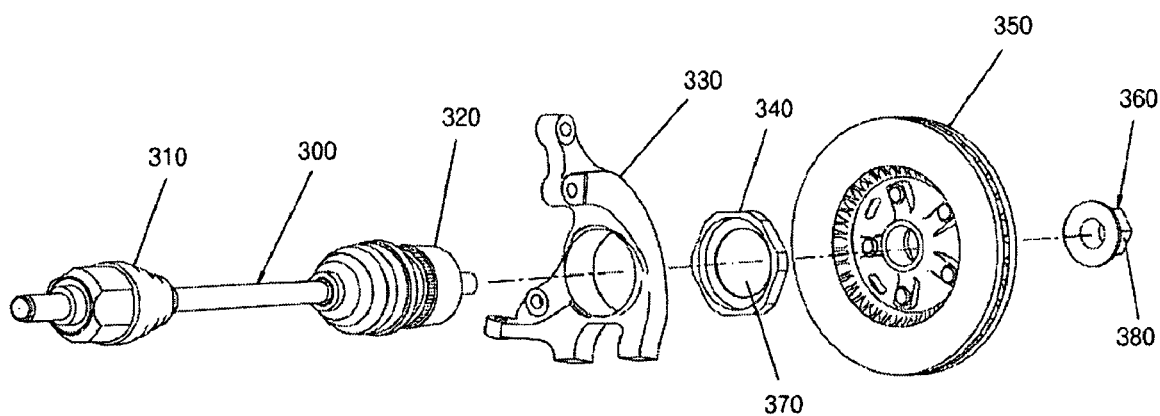
FIG. 4 is an exploded perspective view illustrating the CV joint-bearing mounting structure according to the present invention.
Figure 5:
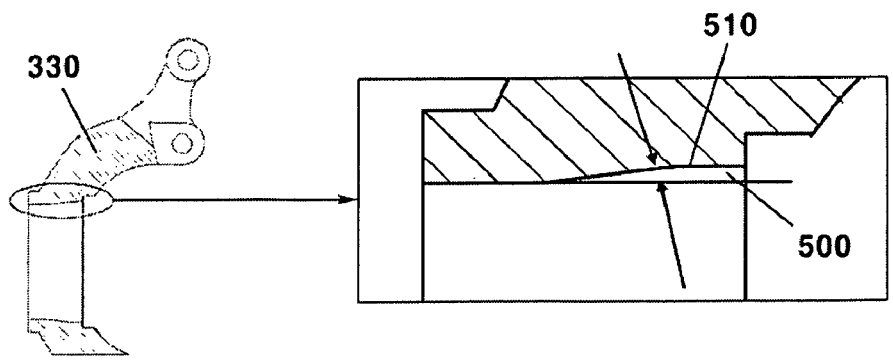
FIG. 5 is a cross-sectional view illustrating the knuckle of the CV joint-bearing mounting structure according to the present invention.
Figure 6:
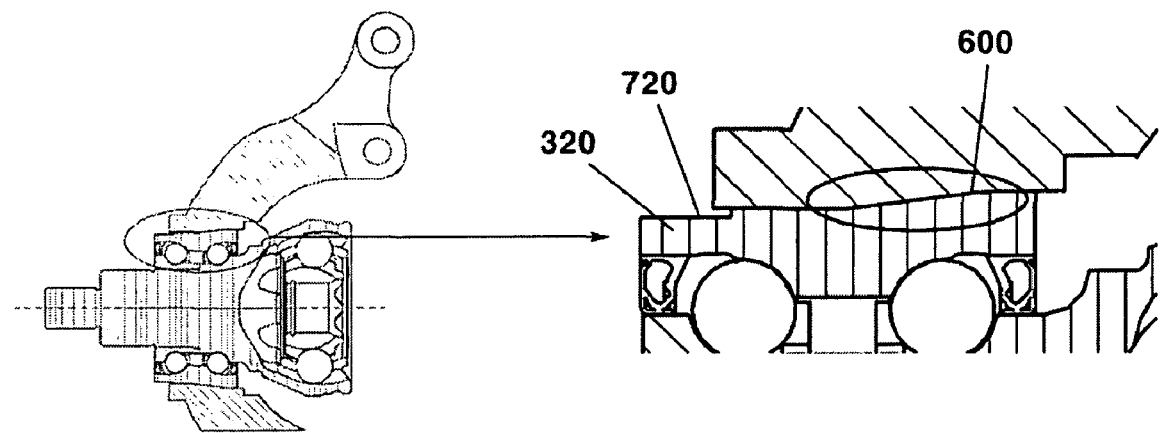
FIG. 6 is an assembled cross sectional view illustrating the knuckle and the bearing of the CV joint-bearing mounting structure according to the present invention.
Figure 7:
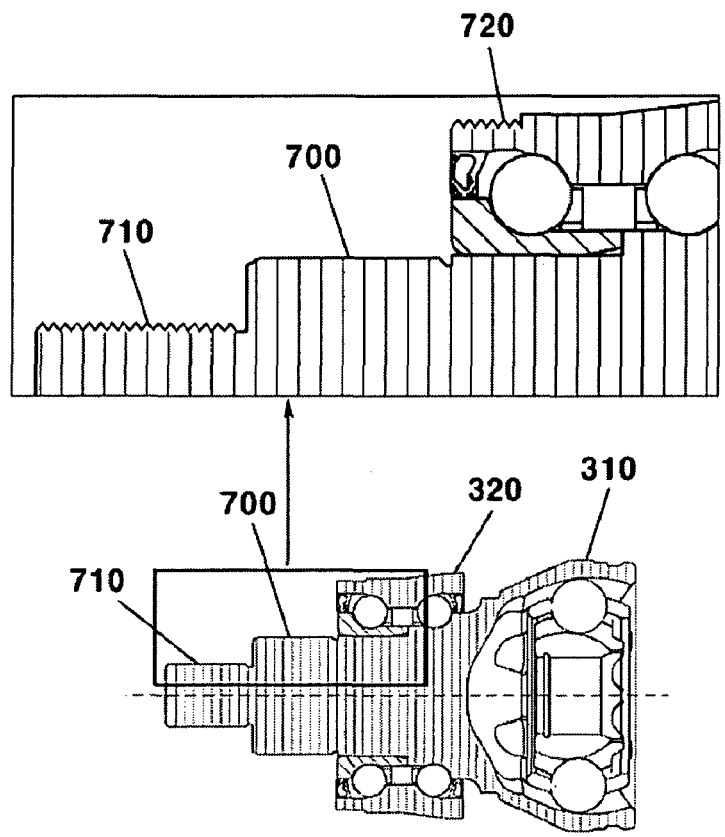
FIG. 7 is a cross sectional view illustrating the steering unit of the CV joint-bearing mounting structure according to the present invention.
Figure 8:
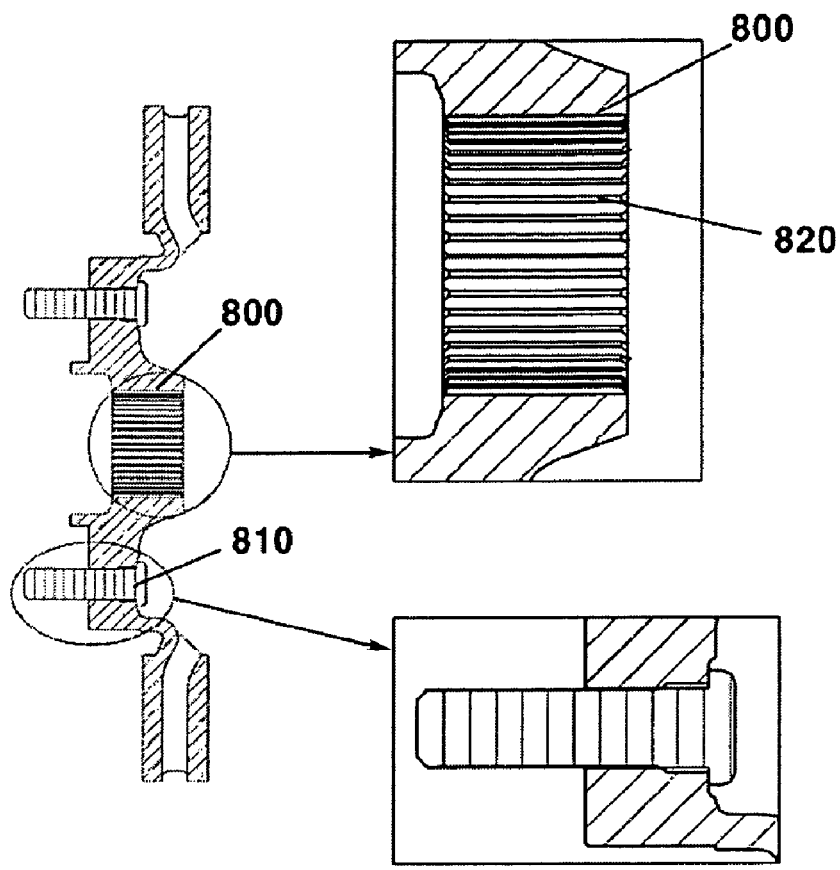
FIG. 8 is a cross sectional view illustrating the disk of the CV joint-bearing mounting structure according to the present invention.

In the accompanying drawings, FIG. 3 is an assembled perspective view illustrating a CV joint-bearing mounting structure according to the present invention, FIG. 4 is an exploded perspective view illustrating the CV joint-bearing mounting structure according to the present invention, FIG. 5 is a cross-sectional view illustrating the knuckle of the CV joint-bearing mounting structure according to the present invention, FIG. 6 is an assembled cross sectional view illustrating the knuckle and the bearing of the CV joint-bearing mounting structure according to the present invention, FIG. 7 is a cross sectional view illustrating the steering unit of the CV joint-bearing mounting structure according to the present invention, and FIG. 8 is a cross sectional view illustrating the disk of the CV joint-bearing mounting structure according to the present invention.

As shown in FIGS. 3 and 4, a steering unit 300 includes a CV joint 310 and a bearing 320, and has a tapered structure, which is coupled with a knuckle 330. Here, a first nut 340 is mounted to the outer circumference 720 of the bearing 320, and a disk 350 and a second nut 360 are mounted to the CV joint 310.

The steering unit 300 is a structure having the bearing 320 coupled to the exterior of the CV joint 310, and is preferably used in a steering system, which serves to change the direction of travel of a vehicle.

As shown in FIG. 7, the CV joint 310 is provided with saw teeth, so that an engagement part 700 is serrated and engaged with the inner portion 800 of the disk 350, and is provided with threads, so that one end portion 710 thereof is screwed to the second nut 360.

Herein, the CV joint 310 indicates a constant velocity universal joint, and is generally used in a front-wheel drive shaft. The CV joint 310 ensures that a front wheel is promptly driven without unbalanced rotation even if the power transmission angle is changed by the steering of the front wheel.

As shown in FIG. 6, in the bearing 320, a portion of the outer circumference 600 forms a tapered face, which is coupled with a tapered recess 500 of the knuckle.

Returning to FIG. 7, the outer circumference 720 of the bearing 320 is provided with threads, so that the bearing 320 can be engaged with the first nut 340.

As shown in FIGS. 5 and 6, in the tapered recess 500 of the knuckle 330, a portion of the inner circumference 510 is tapered, so that the inner circumference 510 can perform sliding engagement with the tapered face of the outer circumference 600 of the bearing 320.

The diameter of the center hole 370 of the first nut 340 is larger than that of the engagement part 700 of the CV joint 310, so that the inner portion 800 of the disk 350 can be partially inserted into the center hole 370 of the first nut 340 after the first nut 340 is engaged with the bearing 320.

As shown in FIG. 8, the disk 350 has a serration structure 820, in the inner circumference of the inner portion 800. The serration structure 820 engages with the toothed engagement part 700 of the CV joint 310, so that power can be transmitted between the disk 350 and the CV joint 310.

In addition, a plurality of bolts 810 is screwed into the disk 350, in positions outside the inner portion 800, so that a wheel can be assembled thereto.

The second nut 360 has a capped portion 380 protruding from one end thereof, and after the disk 350 is mounted to the CV joint 310, is seated in a space between the one end portion 710 of the CV joint 310 and the disk 350.

Hereinafter, the process of assembling the CV joint-bearing mounting structure of the present invention will be described more fully with reference to the accompanying drawings.

FIGS. 9A to 9E are cross sectional views illustrating the process of assembling the CV joint-bearing mounting structure according to the present invention.

Figure 9A:
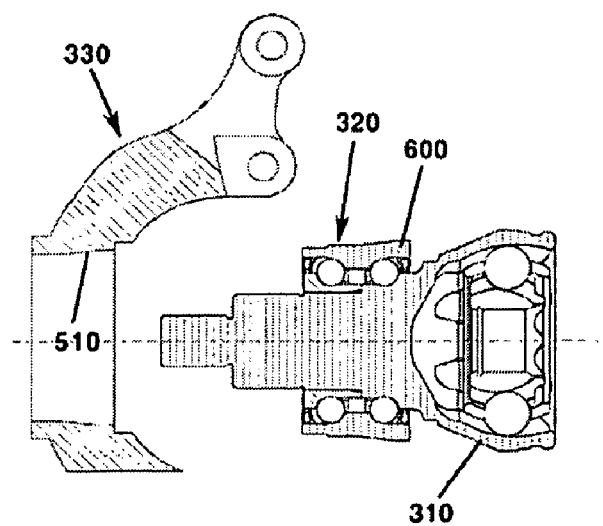
FIGS. 9A to 9E are cross sectional views illustrating a process of assembling the CV joint-bearing mounting structure according to the present invention.

First, as shown in FIG. 9A, in the steering unit 300 having the bearing 320 mounted outside the CV joint 310, the one end 710 of the CV joint 310 is inserted through the inner circumference 510 of the knuckle 330, and the tapered outer circumference 600 of the bearing 320 is slidingly engaged with the tapered recess 500 of the knuckle 330.

The outer circumference 600 of the bearing 320 and the inner circumference 510 of the knuckle 330 have mating shapes such that they imperfectly engage with each other. The outer circumference 600 of the bearing 320 is inclined upwards from the knuckle 330 in the opposite direction so as to be inserted into the inner circumference 510 of the knuckle 330.

The knuckle 330 and the bearing 320, which are engaged with each other via the tapered portions thereof, can reduce the number of bolts compared to the prior art.

Figure 9B:
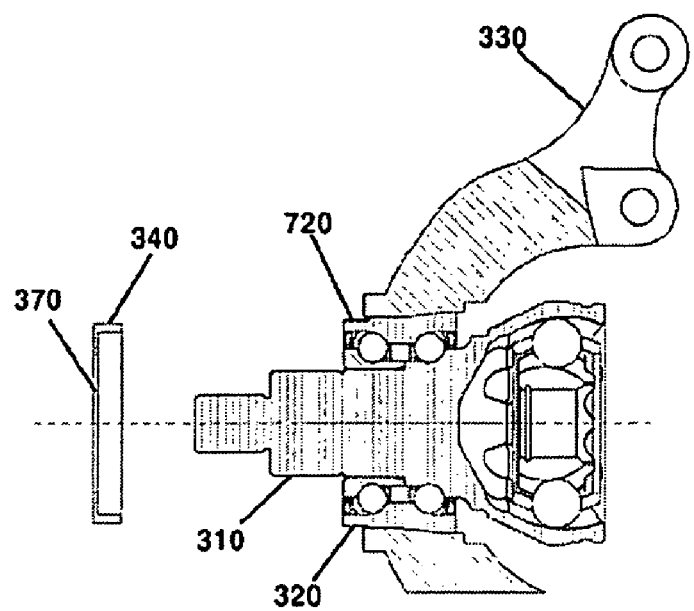

Next, as shown in FIG. 9B, the first nut 340 is engaged with the threads in the outer circumference 720 of the bearing 320, which is projected via the engagement of the steering unit 300 and the knuckle 330, so that the bearing 320 is fixed to the knuckle 330.

Figure 9C:
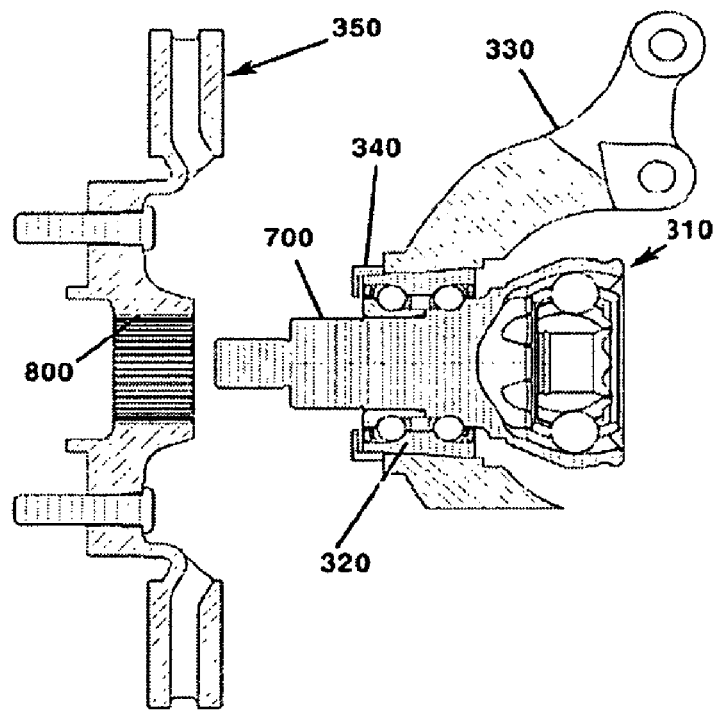

Then, as shown in FIG. 9C, the inner portion 800 of the disk 350 is partially inserted into the space between the center hole 370 of the first nut and the CV joint 310, and the toothed inner portion 800 of the disk 350 is engaged with the engagement part 700 of the CV joint, thereby creating a geared arrangement, so that the disk 350 can be mounted to the CV joint 310.

The disk 350 and the CV joint 310 are serrated with each other, thereby making it possible to reduce the number of bolts compared to the prior art and also improve the efficiency of assembly of the mounting structure.

Figure 9D:
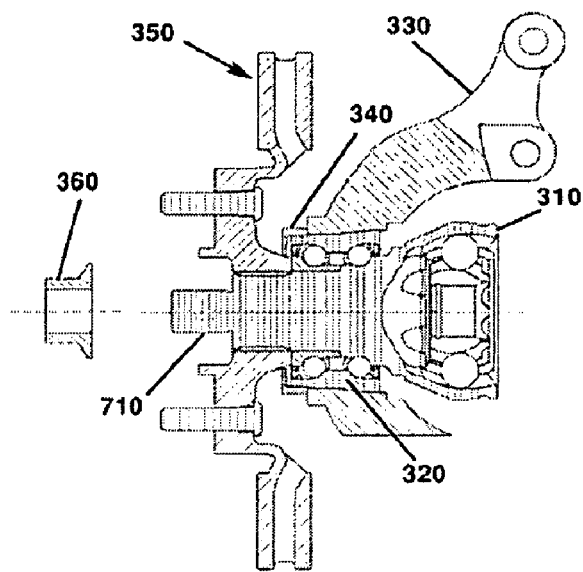
Figure 9E:
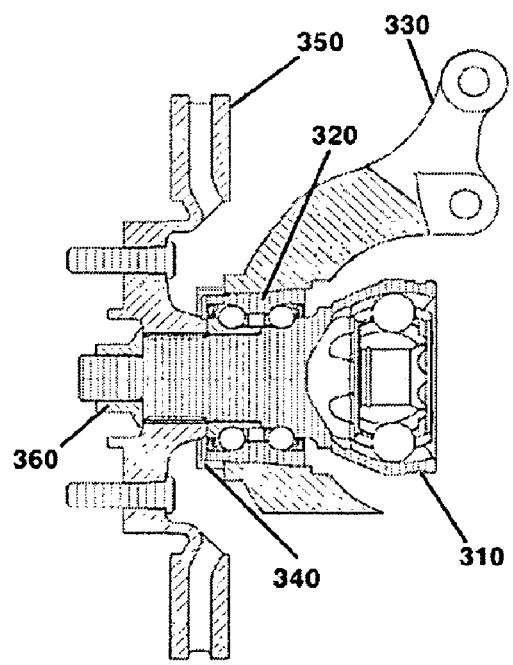

Then, as shown in FIGS. 9D and 9E, the second nut 360 is screwed with the one portion 710 of the CV joint 310 to fix the disk 350 to the CV joint 310, thereby completing the mounting structure of the CV joint 310 and the bearing 320.

The CV joint-bearing mounting structure of the present invention as set forth above has the following advantageous effects.

First, the knuckle and the bearing are engaged with each other via the tapered portions thereof, thereby improving the quality of the bearing beyond that of the bolting structure of the prior art.

Second, the disk and the CV joint are engaged with each other in the serration structure, thereby reducing the assembly tolerance thereof.

Third, after the components are engaged via the tapered and/or toothed portions, the nuts fix the components to each other, thereby improving the efficiency of assembly of the components.

While the present invention has been described with reference to the particular illustrative embodiments and the accompanying drawings, it is not to be limited thereto, but will be defined by the appended claims. It is to be appreciated that those skilled in the art can substitute, change or modify the embodiments in various forms without departing from the scope and spirit of the present invention.

What is claimed is:

1. A constant velocity joint-bearing mounting structure, comprising:
   a steering unit, which includes a constant velocity joint and a bearing having a tapered structure;
   a knuckle, having a tapered recess in an inner circumference thereof, the tapered recess engaging with an outer circumference of the bearing;
   a first nut screwed to an outer end of the bearing, thereby fixing the bearing;
   a disk having a toothed structure in an inner portion thereof, the toothed structure threadedly engaged with an engagement part of the constant velocity joint; and a second nut screwed to one end of the constant velocity joint, so that the disk is fixed to the constant velocity joint.

2. The constant velocity joint-bearing mounting structure according to claim 1, wherein the outer end of the bearing has a thread that engages with the first nut.

3. The constant velocity joint-bearing mounting structure according to claim 1, wherein the engagement part of the constant velocity joint has a threaded structure, which engages with the inner portion of the disk.

4. The constant velocity joint-bearing mounting structure according to claim 1, wherein the one end of the constant velocity joint has a thread to engage with the second nut.

5. The constant velocity joint-bearing mounting structure according to claim 1, wherein a center hole having a predetermined diameter is formed in the first nut, the diameter of the center hole being larger than the diameter of the engagement part of the constant velocity joint.

* * * * *